United States Patent
Dutch et al.

(10) Patent No.: US 8,959,061 B1
(45) Date of Patent: Feb. 17, 2015

(54) RAPID RESTORE FROM A PREPARED SYSTEM IMAGE

(75) Inventors: Michael John Dutch, Saratoga, CA (US); Christopher Hercules Claudatos, San Jose, CA (US); William Dale Andruss, Minneapolis, MN (US); Bruce David Leetch, Mason, OH (US); Steven R. Terwilliger, Foster City, CA (US)

(73) Assignee: EMC Corporation, Hopkinton, MA (US)

( * ) Notice: Subject to any disclaimer, the term of this patent is extended or adjusted under 35 U.S.C. 154(b) by 469 days.

(21) Appl. No.: 12/571,380

(22) Filed: Sep. 30, 2009

(51) Int. Cl.
*G06F 17/30* (2006.01)

(52) U.S. Cl.
USPC ............ 707/686; 709/220; 709/246; 709/248

(58) Field of Classification Search
CPC .................... G06F 17/30067; G06F 17/30073
USPC ............................ 707/650; 709/220, 246, 248
See application file for complete search history.

(56) References Cited

U.S. PATENT DOCUMENTS

| | | | |
|---|---|---|---|
| 6,460,055 B1 | 10/2002 | Midgley et al. | |
| 7,266,595 B1 | 9/2007 | Black et al. | |
| 7,565,517 B1 * | 7/2009 | Arbon | 713/1 |
| 2002/0073106 A1 * | 6/2002 | Parker et al. | 707/200 |
| 2003/0191911 A1 | 10/2003 | Kleinschnitz et al. | |
| 2004/0031030 A1 | 2/2004 | Kidder et al. | |
| 2004/0172574 A1 | 9/2004 | Wing et al. | |
| 2006/0020662 A1 | 1/2006 | Robinson | |
| 2006/0036658 A1 | 2/2006 | Henrickson | |
| 2006/0064474 A1 * | 3/2006 | Feinleib et al. | 709/220 |
| 2007/0168478 A1 * | 7/2007 | Crosbie | 709/221 |
| 2008/0098099 A1 | 4/2008 | Khasnis et al. | |
| 2009/0089523 A1 | 4/2009 | Tsaur et al. | |
| 2009/0164994 A1 | 6/2009 | Vasilevsky et al. | |
| 2009/0276439 A1 | 11/2009 | Rosenblatt et al. | |
| 2010/0050097 A1 | 2/2010 | McGreevy et al. | |

* cited by examiner

*Primary Examiner* — Rehana Perveen
*Assistant Examiner* — Alexander Khong
(74) *Attorney, Agent, or Firm* — Theodore A. Chen; Krishnendu Gupta

(57) ABSTRACT

A method, article of manufacture, and apparatus for efficiently restoring a target system are disclosed. In some embodiments, a target is analyzed. A target profile is created based on the analysis. The target profile is then compared to a source profile. A profile difference is generated based on the comparison. The source image is modified based on the profile difference, and the modified image is then stored on the target. In some embodiments, modifying the source image may include removing or adding software components.

19 Claims, 4 Drawing Sheets

RAPID RESTORE FROM A PREPARED SYSTEM IMAGE

CROSS-REFERENCE TO RELATED APPLICATIONS

This application is related to co-pending U.S. patent application Ser. No. 12/571,377 for PREPARATION OF A SYSTEM IMAGE FOR RAPID RESTORE and filed concurrently herewith, which is incorporated herein by reference for all purposes and co-pending U.S. patent application Ser. No. 12/571,384 for REDUNDANT BACKUP ELIMINATION and filed concurrently herewith, which is incorporated herein by reference for all purposes.

FIELD OF THE INVENTION

The present invention relates generally to data systems, and more particularly, to systems and methods of efficiently backing up and restoring information.

BACKGROUND OF THE INVENTION

A conventional method of backing up information includes creating a copy of a client computer system's information (an image) and storing the image in a remote location. Thereafter, if a client suffers data loss (such as hard disk failure, destroyed in a fire, data corruption, data integrity error, etc.), only the information on the client machine is lost. Since the image is in a remote location, the image is not affected by the data loss event. Typically, a new machine is used to replace the client computer system, and the image is then restored to the new machine. This restores the client computer system to the exact condition the client computer system was in at the time of image creation, without the need for time-consuming installations (e.g. operating system installation, application installation, customizations, etc.)

Unfortunately, the original client computer system and the new client computer system may not be identical. This can create usability issues with the image. If the image contained drivers for a certain set of hardware (such as modems, video cards, sound cards, processors, etc.), the image may not work correctly with a different set of hardware. Further, images may not be updated for months or years, exacerbating the problems between original hardware and new hardware. There is a need, therefore, for an improved method, article of manufacture, and apparatus for backing up and recovering information.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
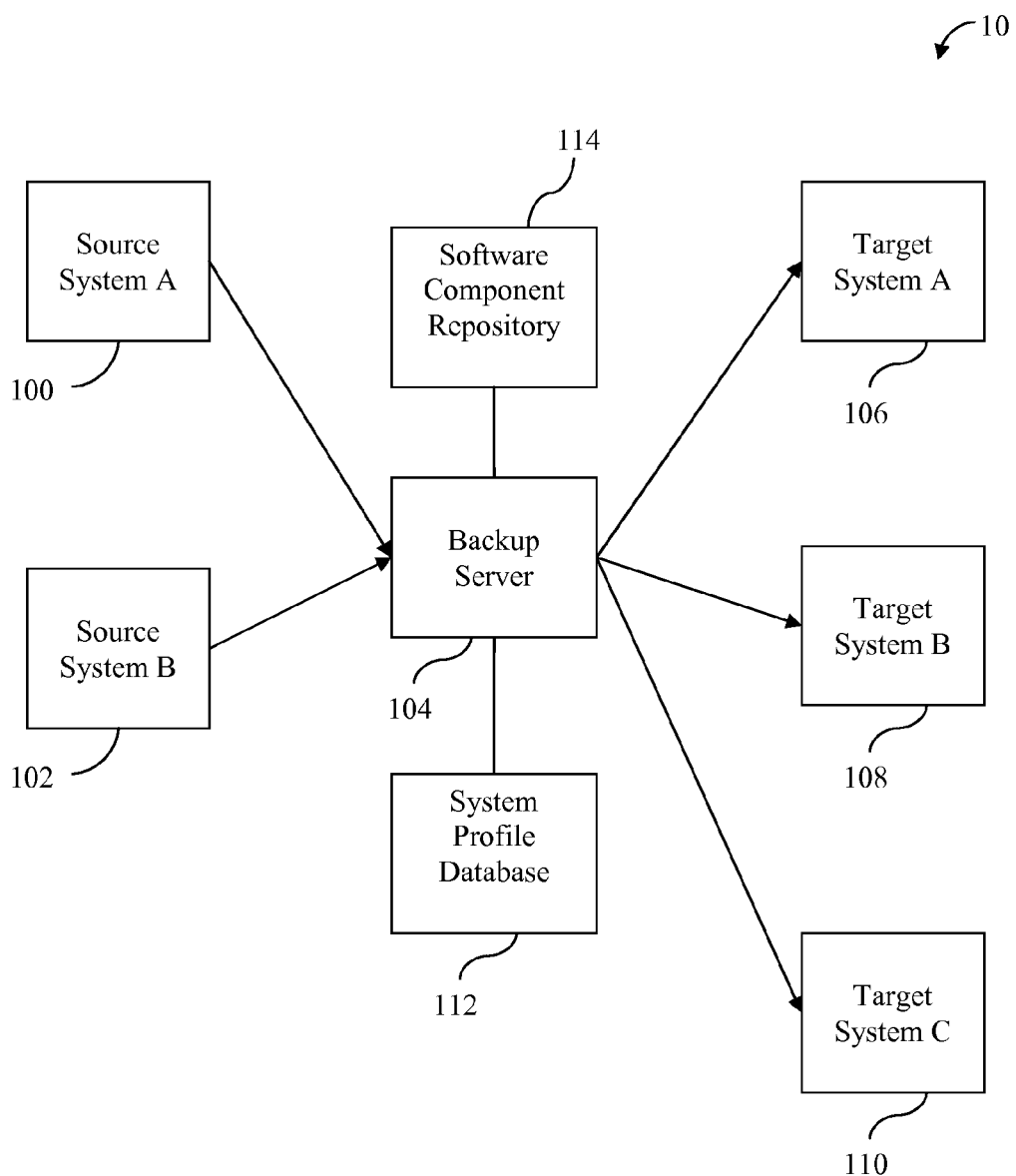
FIG. 1 is a diagram of an embodiment of a system in accordance with the invention.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium containing computer readable instructions or computer program code, or as a computer program product, comprising a computer usable medium having a computer readable program code embodied therein. In the context of this disclosure, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded in whole or in part through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

An embodiment of the invention will be described with reference to a computer system configured to store files, but it should be understood that the principles of the invention are not limited to computer systems. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Disclosed herein are a method and system to efficiently backup information and rapidly recover the information to potentially dissimilar systems. Conventional backups create an image of a client computer system (source system). When the source system fails, the image is typically restored to a new computer system (target system). However, restoring the system disk of a running system can be problematic. System files may be locked, preventing deletion of replacement. Further, the restore may result in an unusable computer system when the target system has different hardware components than the source system. For example, hardware components on the target system will fail to operate correctly if associated software components (e.g. device drivers, etc.) are missing from the image.

Though a source system is described herein as a computer system containing hardware, it should be understood that the source system is not limited to such forms. For example, a source system may be a virtual machine residing in a physical host machine.

The source system's configuration may also result in an unusable target system. For example, if the source system's hard disk was partitioned into two 500 GB partitions, its image may not work properly on a target system with a different partition scheme. Another example includes network configurations. If the target system's network subnet location differs from that of the source system's, the target system may not have access to the network.

The source system may also have services and processes that automatically start upon system boot. This is particularly true in corporate environments, where Information Technology (IT) departments require all corporate computers to run specific applications (e.g. virus protection, user-authentication, etc.). These services and processes may sometimes have dependencies on hardware components. If the target system has different hardware components, the services and processes may fail to start during a system boot or may cause the target system to crash during the system boot.

The present invention addresses these issues by using system profiles. FIG. 1 illustrates a backup system 10 in accordance with an embodiment of the present invention. Source System A 100 and Source System B 102 use Backup Server 104 to backup their respective images. System Profile Database 112 contains profiles of Source System A 100 and Source System B 102. Software Component Repository 114 contains various software components (e.g. device drives, etc.) for various source systems and target systems. Target System A 106, Target System B 108, and Target System C 110 are the target systems which receive the images from the source systems. Though FIG. 1 illustrates only two source systems and three target systems, other embodiments may include a different number of source systems, target systems, and servers. For example, in some embodiments, there may be only one source system, and a server may be used to "push" its image out to a plurality of target systems (e.g. replication).

Further, though FIG. 1 illustrates a System Profile Database 112 to be external to Backup Server 104, in some embodiments, System Profile Database 112 may be inside a backup server. In some embodiments, the system profile database may include a distributed collection of profiles stored together with their associated backup images. Further, in some embodiments, source systems may report their respective profiles directly to the system profile database, and separate from images they send to the backup server. There are numerous configurations possible.

Similarly, Software Component Repository 114 may be internal or external to Backup Server 104.

Figure 2:
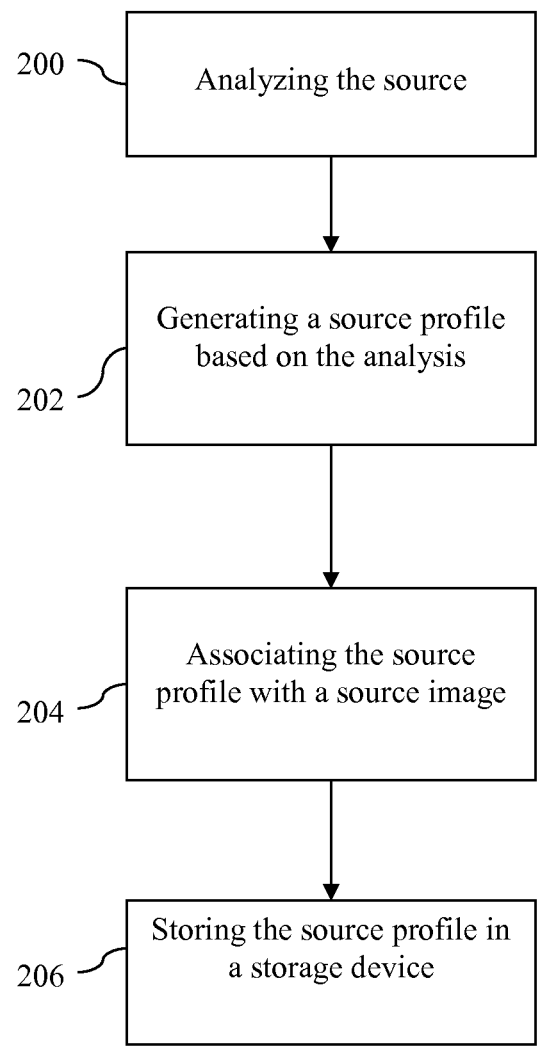
FIG. 2 is a flow chart of a method to process data in accordance with some embodiments.

The method for generating a profile of a source system in accordance with one embodiment is illustrated in FIG. 2. In step 200, a source image is analyzed. In step 202, a source profile is generated based on the analysis. In step 204, the source profile is associated with a source image. In step 206, the source profile is stored in a storage device.

The source profile contains information about the source system. In some embodiments, this information may include information about device drivers for hardware devices installed on the source system (e.g. name of device drivers, version, etc.), configuration settings that enable the operation of hardware devices installed on the source system (e.g. network interface configuration, static IP address, etc.), and the configuration settings that enable services or processes installed on a source system to operate correctly (e.g. location of services hosted by a server, etc.).

There are various methods to create a source profile. In some embodiments, the source profile may be created by using interfaces provided by or data maintained by the operating system. In other words, a source profile may be generated by analyzing a running source system. Programs such as HomeBase, a product available from EMC, generate source profiles by analyzing the running source system.

In some embodiments, a source profile may be generated by analyzing the source image. This may be preferable when the source system is no longer functioning (e.g. the source system can no longer operate the operating system), and no profile has been generated.

In some embodiments, the source profile is created as a generalized document in a standard language such as XML. The source profile may be stored in a file that is part of the source image, or it may be stored separate from the source image.

Figure 3:
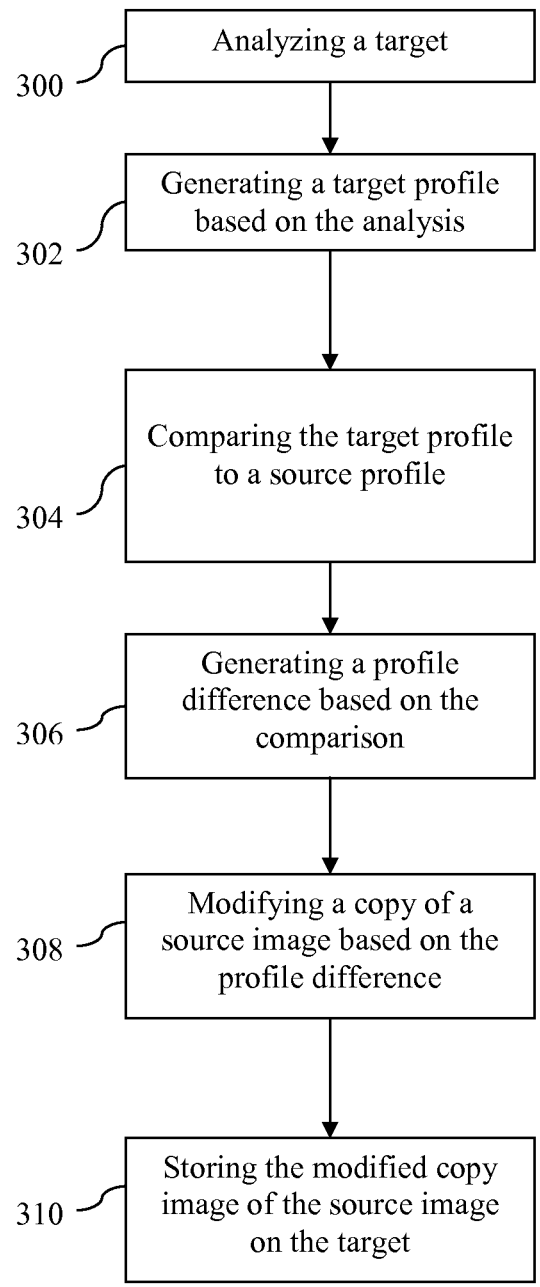
FIG. 3 is a flow chart of a method to process data in accordance with some embodiments.

The method for restoring a target system in accordance with one embodiment is illustrated in FIG. 3. In step 300, a target system is analyzed. In step 302, a target profile is generated based on the analysis. In step 304, the target profile is compared to a source profile. In step 306, a profile difference is generated based on the comparison. In step 308, the source image is modified based on the profile difference. In step 310, the modified image is stored on the target system.

A backup image of a computer system can be created multiple times and can be identified by a computer system name and the time the backup image was created. Similarly, a profile of a computer system can be created multiple times and can be identified by the computer system name and the time the profile was created.

When restoring a target computer system, the user selects which backup image of the source computer system to use. While this is often the most current backup image, there are many reasons when a backup image made at an earlier point in time is selected (e.g., if data on the most current backup image was corrupted by a virus or a user wanted to recreate earlier project environment).

A backup image for a computer system is associated with a profile of the same computer system which reflects the hardware configuration of the computer system (including network addressing) when the backup was created. A profile created after such a configuration change should not be associated with a backup image created before that configuration change occurred If a backup image is created after the source computer system configuration is changed, that backup image cannot be used to restore a target computer system with dissimilar hardware until another profile of the source computer system is created.

A profile which reflects the hardware configuration of the target computer system at the time of the restore (preferably created before a restore is needed to speed the recovery process) is compared to a profile associated with the desired source computer system backup image.

In some embodiments, a target profile may be created in a similar manner as a source profile (e.g. analyzing a running target system). However, in some embodiments, the target system may be a bare metal machine (e.g. no operating system, no applications, no data stored, etc.). In such embodiments, it may be preferable to create the target profile by utilizing a preinstallation environment (PE). For example, Windows PE allows for the identification of hardware devices without actually installing a full working version of windows.

In some embodiments, a profile difference may be a file listing the differences between a source profile and a target profile. For example, if the only difference between the source profile and the target profile was the network card, the source difference would indicate to remove the network card driver from the source image, and add the target system's network card driver to the source image.

There are multiple ways to use a source image to create a "restore image", i.e., the image used to restore a target system. In some embodiments, the restore image may be created using an Application Programming Interface (API). For example, if an API to update an image is provided by the backup application which created the source image, then the backup application knows how the information is organized in the source image (e.g. where the drivers are, where the configurations settings are, etc.).

In some embodiments, a copy of the source image may be modified by a user to create the restore image For example, the user may mount a copy of the source image on a backup server, and manually remove old drivers or install new drivers.

In some embodiments, copies of a single source image may be modified according to multiple target profiles to restore multiple target systems. This may be preferable when the target systems are not identical, but have similar images (e.g. same operating system, same applications, but different network configuration settings, different hardware, etc.). For example, an IT department may have a policy in which a standard image is used for all new employees, but each employee has different hardware.

It may be more efficient to have one source image and multiple target profiles, as opposed to having an image for each target system. System images are typically many gigabytes in size. Storing images of many computer systems therefore consumes a large amount of storage capacity. Profiles, on the other hand, typically require a few megabytes to store. By storing one image and multiple target profiles, as opposed to storing images for each target, considerable savings in storage capacity may be realized.

Multiple computer systems can be efficiently restored to a common state by creating a profile for each computer system with dissimilar hardware and a backup image for just one of them (referred to as the source computer system). Creating profiles instead of backup images for the other (target) computer systems is significantly more efficient than running backup processes for each of the target computer systems. This is because the process of creating and storing a profile consumes significantly less computer, network, and storage resources than creating and storing a backup image. In this manner, the redundant backup processes and backup images for the target computer systems can be eliminated. The source computer system can be restored to its original state by recovering its backup image. Each target computer system can be restored to the same original state by restoring a recovery image created based on the source computer backup image and the difference between the source computer profile and its profile as detailed previously.

For example, a teacher may wish to backup a computer lab, which has multiple computers. Comparing the computers to each other may reveal varying hardware and configurations, but identical operating systems, applications, documents, etc. Instead of creating an image for each computer (e.g. redundant images), only one image needs to be created from one source computer. Each other computer can be restored based on the source computer image and the difference between the source computer profile and its profile as detailed previously. By creating one image and multiple profiles, as opposed to multiple redundant images, considerable savings in bandwidth and storage capacity may be realized. Further savings may be realized by removing software components from the image (e.g. removing drivers, network configurations, etc.).

Figure 4:
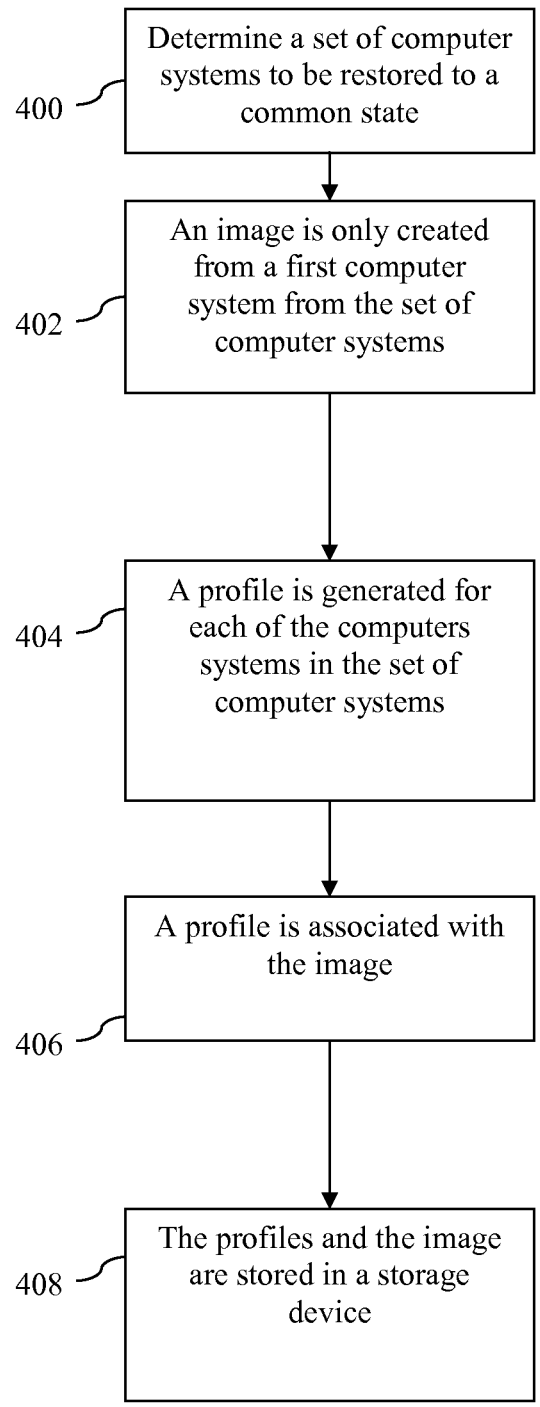
FIG. 4 is a flow chart of a method to process data in accordance with some embodiments.

The method to reduce redundant backups in accordance with one embodiment is illustrated in FIG. 4. In step 400, a set of computer systems is determined to be restored to a common state. In step 402, an image is only created from a first computer system from the set of computer systems. In step 404, a profile is generated for each of the computer systems in the set of computer systems. In step 406, a profile is associated with the image. In step 408, the profiles and the image are stored in a storage device.

As used herein, data may refer to any information stored on a computer system. For example, source data may be any information stored on a source, including application code, documents, configuration information, etc.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method for restoring a target using a profile difference based on the comparison of the target profile to a source profile, comprising:
   analyzing the target;
   creating a target profile based on the analysis, wherein the target profile includes device driver information and configuration settings, and wherein the target profile is an XML document;
   receiving a source profile and a source image from a source, wherein the source profile and source image are separate, wherein the source profile identifies source device drivers;
   comparing the target profile to the source profile, wherein the source profile is retrieved after a user selects the source image;
   generating a profile difference based on the comparison of the target profile to a source profile;
   modifying a source image based on the profile difference; and
   storing the modified image on the target.

2. The method as recited in claim 1, wherein the source profile is retrieved from a source profile database.

3. The method as recited in claim 1, wherein modifying the source image includes removing software components from the source image.

4. The method as recited in claim 1, wherein modifying the source image includes adding software components to the source image.

5. The method as recited in claim 1, wherein analyzing the target includes analyzing a running target system.

6. The method as recited in claim 1, wherein analyzing the target system includes analyzing a preinstallation environment target system.

7. The method as recited in claim 1, further comprising storing the profile difference in a storage device.

8. A system for restoring a target using a profile difference based on the comparison of the target profile to a source profile, comprising:
   the target; and
   a processor configured to:
      analyze the target;
      create a target profile based on the analysis, wherein the target profile includes device driver information and configuration settings, and wherein the target profile is an XML document;
      receive a source profile and a source image from a source, wherein the source profile and source image are separate, wherein the source profile identifies source device drivers;
      compare the target profile to the source profile, wherein the source profile is retrieved after a user selects the source image;
      generate a profile difference based on the comparison of the target profile to a source profile;
      modify a source image based on the profile difference; and
      store the modified image on the target.

9. The system as recited in claim 8, wherein the processor is further configured to store the profile difference in a storage device.

10. The system as recited in claim 8, wherein the source profile is retrieved from a source profile database.

11. The system as recited in claim 8, wherein modify the source image includes add software components to the source image.

12. The system as recited in claim 8, wherein modify the source image includes remove software components from the source image.

13. The system as recited in claim 8, wherein analyze the target system includes analyze a preinstallation environment target system.

14. The system as recited in claim 8, wherein analyze the target system includes analyze a running target system.

15. A computer program product for restoring a target using a profile difference based on the comparison of the target profile to a source profile, comprising a non-transitory computer readable medium having program instructions embodied therein for:
   analyzing the target;
   creating a target profile based on the analysis, wherein the target profile includes device driver information and configuration settings, and wherein the target profile is an XML document;
   receiving a source profile and a source image from a source, wherein the source profile and source image are separate, wherein the source profile identifies source device drivers;
   comparing the target profile to the source profile, wherein the source profile is retrieved after a user selects the source image;
   generating a profile difference based on the comparison of the target profile to a source profile;
   modifying a source image based on the profile difference; and
   storing the modified image on the target.

16. The computer program product as recited in claim 15, wherein the source profile is retrieved from a source profile database.

17. The computer program product as recited in claim 15, wherein modifying the source image includes removing software components from the source image.

18. The computer program product as recited in claim 15, wherein modifying the source image includes adding software components to the source image.

19. The computer program product as recited in claim 15, wherein analyzing the target includes analyzing a running target system profile.

* * * * *